(12) United States Patent
Kang et al.

(10) Patent No.: US 9,778,398 B2
(45) Date of Patent: Oct. 3, 2017

(54) HARD COATING FILM AND PREPARATION METHOD THEREOF

(71) Applicant: LG CHEM, LTD., Seoul (KR)

(72) Inventors: Joon Koo Kang, Daejeon (KR); Eun Kyu Her, Daejeon (KR); Yeong Rae Chang, Daejeon (KR); Soon Hwa Jung, Daejeon (KR); Jin Young Park, Daejeon (KR); Hyeok Jeong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 198 days.

(21) Appl. No.: 14/404,220

(22) PCT Filed: May 31, 2013

(86) PCT No.: PCT/KR2013/004812
§ 371 (c)(1),
(2) Date: Nov. 26, 2014

(87) PCT Pub. No.: WO2013/180514
PCT Pub. Date: Dec. 5, 2013

(65) Prior Publication Data
US 2015/0140279 A1 May 21, 2015

(30) Foreign Application Priority Data

May 31, 2012 (KR) .................. 10-2012-0058634
May 31, 2012 (KR) .................. 10-2012-0058635
(Continued)

(51) Int. Cl.
*B05D 3/06* (2006.01)
*G02B 1/10* (2015.01)
(Continued)

(52) U.S. Cl.
CPC ............. *G02B 1/14* (2015.01); *B05D 3/067* (2013.01); *C08F 290/061* (2013.01);
(Continued)

(58) Field of Classification Search
CPC .. C08J 7/042; C08J 7/047; G02B 1/14; G02B 1/105; B05D 3/067; C08F 290/061; C09D 4/00
See application file for complete search history.

(56) References Cited

U.S. PATENT DOCUMENTS 4,902,578 A   2/1990   Kerr, III
6,245,833 B1  6/2001   Kang et al.
(Continued)

FOREIGN PATENT DOCUMENTS

CN   1558824 A   12/2004
CN   1611968 A   5/2005
(Continued)

OTHER PUBLICATIONS

Translation of JP2011-075705; published Apr. 14, 2011.*
(Continued)

*Primary Examiner* — Catherine A Simone
(74) *Attorney, Agent, or Firm* — Rothwell, Figg, Ernst & Manbeck, P.C.

(57) ABSTRACT

The present invention relates to a hard coating film and a preparation method thereof, and, more particularly, to a hard coating film having high hardness and excellent properties and a method of preparing the same. The method is advantageous in that a high-hardness hard coating film, which is not easily curled, can be easily prepared. The hard coating film prepared by this method can be usefully used in various fields because it has high hardness, scratch resistance, transparency, durability, light resistance, light transmittance and the like.

7 Claims, 3 Drawing Sheets

(30) Foreign Application Priority Data

| | | | |
|---|---|---|---|
| May 31, 2012 | (KR) | ................ | 10-2012-0058636 |
| May 31, 2012 | (KR) | ................ | 10-2012-0058637 |
| Aug. 23, 2012 | (KR) | ................ | 10-2012-0092529 |
| Aug. 23, 2012 | (KR) | ................ | 10-2012-0092532 |
| Aug. 23, 2012 | (KR) | ................ | 10-2012-0092533 |
| Aug. 27, 2012 | (KR) | ................ | 10-2012-0093689 |
| May 30, 2013 | (KR) | ................ | 10-2013-0062130 |

(51) Int. Cl.

| | | |
|---|---|---|
| *G02B 1/14* | (2015.01) | |
| *C08J 7/04* | (2006.01) | |
| *C08F 290/06* | (2006.01) | |
| *C09D 4/00* | (2006.01) | |
| *C08G 83/00* | (2006.01) | |
| *C08F 222/10* | (2006.01) | |

(52) U.S. Cl.
CPC ............... *C08J 7/042* (2013.01); *C08J 7/047* (2013.01); *C09D 4/00* (2013.01); *G02B 1/105* (2013.01); *C08F 2222/1026* (2013.01); *C08F 2222/1086* (2013.01); *C08G 83/007* (2013.01); *C08J 2363/02* (2013.01); *C08J 2367/02* (2013.01); *C08J 2400/21* (2013.01); *C08J 2435/02* (2013.01); *C08J 2475/14* (2013.01); *Y10T 428/24628* (2015.01)

(56) References Cited

U.S. PATENT DOCUMENTS

| | | | |
|---|---|---|---|
| 6,489,015 | B1 | 12/2002 | Tsuchiya et al. |
| 7,622,055 | B2 | 11/2009 | Nakano et al. |
| 2003/0008162 | A1 | 1/2003 | Oya et al. |
| 2004/0081831 | A1 | 4/2004 | Shoshi et al. |
| 2004/0135159 | A1 | 7/2004 | Siegel |
| 2005/0136252 | A1 | 6/2005 | Chisholm et al. |
| 2005/0136273 | A1 | 6/2005 | Hashimoto et al. |
| 2006/0134400 | A1 | 6/2006 | Takada et al. |
| 2006/0234035 | A1 | 10/2006 | Wang et al. |
| 2006/0286383 | A1 | 12/2006 | Gilmer |
| 2007/0178297 | A1 | 8/2007 | Takada et al. |
| 2007/0231566 | A1 | 10/2007 | Yoneyama et al. |
| 2007/0237966 | A1 | 10/2007 | Takao et al. |
| 2008/0145673 | A1 | 6/2008 | Bonnard |
| 2008/0193722 | A1 | 8/2008 | Tanaka |
| 2008/0218666 | A1 | 9/2008 | Toyooka |
| 2008/0257216 | A1 | 10/2008 | Ravyst |
| 2008/0311351 | A1 | 12/2008 | Hsu et al. |
| 2009/0169896 | A1 | 7/2009 | Sohn et al. |
| 2009/0214871 | A1 | 8/2009 | Fukuda et al. |
| 2009/0301561 | A1 | 12/2009 | Wang et al. |
| 2010/0084037 | A1 | 4/2010 | Ericsson et al. |
| 2010/0124631 | A1 | 5/2010 | Horio et al. |
| 2010/0124656 | A1 | 5/2010 | Horio et al. |
| 2010/0167068 | A1 | 7/2010 | Horio |
| 2011/0050623 | A1 | 3/2011 | Lee et al. |
| 2011/0124823 | A1 | 5/2011 | Hayashi et al. |
| 2012/0019766 | A1 | 1/2012 | Oki et al. |
| 2012/0034450 | A1 | 2/2012 | Morita et al. |
| 2012/0128890 | A1 | 5/2012 | Mirchev |
| 2014/0079937 | A1 | 3/2014 | Jung et al. |
| 2015/0299507 | A1 | 10/2015 | Kang et al. |

FOREIGN PATENT DOCUMENTS

| | | |
|---|---|---|
| CN | 1898341 A | 1/2007 |
| CN | 1934140 A | 3/2007 |
| CN | 101701129 A | 5/2010 |
| CN | 102105515 A | 6/2011 |
| CN | 102257087 A | 11/2011 |
| EP | 0323560 A2 | 7/1989 |
| EP | 0442305 A2 | 8/1991 |
| EP | 0699704 A1 | 3/1996 |
| EP | 1162246 A1 | 12/2001 |
| EP | 2 840 109 A1 | 2/2015 |
| EP | 2 840 110 A1 | 2/2015 |
| EP | 2840107 A1 | 2/2015 |
| EP | 2 842 989 A1 | 3/2015 |
| EP | 2843008 A1 | 3/2015 |
| EP | 2857440 A1 | 4/2015 |
| JP | 10-036540 A | 2/1998 |
| JP | H11-333370 A | 12/1999 |
| JP | 2000-015734 A | 1/2000 |
| JP | 2000-071392 A | 3/2000 |
| JP | 2000-103887 A | 4/2000 |
| JP | 2000-214791 A | 8/2000 |
| JP | 2000-286179 A | 10/2000 |
| JP | 2000-293895 A | 10/2000 |
| JP | 2001-205179 A | 7/2001 |
| JP | 2001-323087 A | 11/2001 |
| JP | 2002-067238 A | 3/2002 |
| JP | 2002-338720 A | 11/2002 |
| JP | 2005-053094 A | 3/2005 |
| JP | 2005-343119 A | 12/2005 |
| JP | 2006-051781 A | 2/2006 |
| JP | 2007-145965 A | 6/2007 |
| JP | 2007-262281 A | 10/2007 |
| JP | 2007-313872 A | 12/2007 |
| JP | 2008-074112 A | 4/2008 |
| JP | 2008-075092 A | 4/2008 |
| JP | 4069499 B2 | 4/2008 |
| JP | 4075147 B2 | 4/2008 |
| JP | 2008-116596 A | 5/2008 |
| JP | 2008-138165 A | 6/2008 |
| JP | 2008-150484 A | 7/2008 |
| JP | 2008-156387 A | 7/2008 |
| JP | 2008-165041 A | 7/2008 |
| JP | 2008-310286 A | 12/2008 |
| JP | 2009-025808 A | 2/2009 |
| JP | 2009-204725 A | 9/2009 |
| JP | 2009-204727 A | 9/2009 |
| JP | 2009-241458 A | 10/2009 |
| JP | 2009-255565 A | 11/2009 |
| JP | 2010-001431 A | 1/2010 |
| JP | 2010-017991 A | 1/2010 |
| JP | 2010-023507 A | 2/2010 |
| JP | 2010-024449 A | 2/2010 |
| JP | 2010-024450 A | 2/2010 |
| JP | 2010-052334 A | 3/2010 |
| JP | 2010-053231 A | 3/2010 |
| JP | 2010-085985 A | 4/2010 |
| JP | 2010-121013 A | 6/2010 |
| JP | 4496424 B2 | 7/2010 |
| JP | 2010-173234 A | 8/2010 |
| JP | 2010-284910 A | 12/2010 |
| JP | 2011-022456 A | 2/2011 |
| JP | 2011-031457 A | 2/2011 |
| JP | 2011-031527 A | 2/2011 |
| JP | 2011-504828 A | 2/2011 |
| JP | 2011-505452 A | 2/2011 |
| JP | 2011-046917 A | 3/2011 |
| JP | 2011-075705 A | 4/2011 |
| JP | 2011075705 A * | 4/2011 |
| JP | 2011-093290 A | 5/2011 |
| JP | 2011-126160 A | 6/2011 |
| JP | 2011-126164 A | 6/2011 |
| JP | 2011-126165 A | 6/2011 |
| JP | 2011-145593 A | 7/2011 |
| JP | 2011-148181 A | 8/2011 |
| JP | 2011-148301 A | 8/2011 |
| JP | 2011-523370 A | 8/2011 |
| JP | 2011-178910 A | 9/2011 |
| JP | 2011-183561 A | 9/2011 |
| JP | 2011-201087 A | 10/2011 |
| JP | 2011-225846 A | 11/2011 |
| JP | 2011-246548 A | 12/2011 |
| JP | 2012-027190 A | 2/2012 |
| JP | 2012-027401 A | 2/2012 |
| JP | 2012-051118 A | 3/2012 |
| JP | 2012-063577 A | 3/2012 |
| JP | 2012-066477 A | 4/2012 |

(56) References Cited

FOREIGN PATENT DOCUMENTS

| | | |
|---|---|---|
| JP | 2012-072235 A | 4/2012 |
| JP | 4911474 B2 | 4/2012 |
| JP | 2012-518713 A | 8/2012 |
| JP | 2012-206262 A | 10/2012 |
| JP | 2013-095108 A | 5/2013 |
| KR | 10-1998-0020031 A | 3/1999 |
| KR | 10-1999-0072670 A | 9/1999 |
| KR | 10-2000-0021805 A | 4/2000 |
| KR | 10-2000-0021806 A | 4/2000 |
| KR | 10-2002-0008267 A | 1/2002 |
| KR | 10-0867338 B1 | 9/2002 |
| KR | 10-2004-0037081 A | 5/2004 |
| KR | 10-2004-0076422 A | 9/2004 |
| KR | 10-2004-0083916 A | 10/2004 |
| KR | 10-2004-0097189 A | 11/2004 |
| KR | 10-2006-0009194 A | 1/2006 |
| KR | 10-2007-0039742 A | 4/2007 |
| KR | 10-0730414 B1 | 6/2007 |
| KR | 10-0735894 B1 | 6/2007 |
| KR | 10-2007-0098560 A | 10/2007 |
| KR | 10-2007-0111352 A | 11/2007 |
| KR | 10-2008-0005839 A | 1/2008 |
| KR | 10-2008-0055698 A | 6/2008 |
| KR | 10-0852562 B1 | 8/2008 |
| KR | 10-2008-0109658 A | 12/2008 |
| KR | 10-2009-0020106 A | 2/2009 |
| KR | 10-0884079 B1 | 2/2009 |
| KR | 10-2009-0044089 A | 5/2009 |
| KR | 10-2009-0061821 A | 6/2009 |
| KR | 10-2009-0063182 A | 6/2009 |
| KR | 10-0905683 B1 | 6/2009 |
| KR | 10-2009-0073668 A | 7/2009 |
| KR | 10-0926220 B1 | 11/2009 |
| KR | 10-2010-0019661 A | 2/2010 |
| KR | 10-0945063 B1 | 2/2010 |
| KR | 10-2010-0026012 A | 3/2010 |
| KR | 10-2010-0026014 A | 3/2010 |
| KR | 10-2010-0037519 A | 4/2010 |
| KR | 10-2010-0041992 A | 4/2010 |
| KR | 10-2010-0045997 A | 5/2010 |
| KR | 10-2010-0077798 A | 7/2010 |
| KR | 10-2010-0098320 A | 9/2010 |
| KR | 10-2010-0121281 A | 11/2010 |
| KR | 10-2010-0124477 A | 11/2010 |
| KR | 10-2010-0129512 A | 12/2010 |
| KR | 10-2010-0130367 A | 12/2010 |
| KR | 10-2010-0132786 A | 12/2010 |
| KR | 10-2011-0034324 A | 4/2011 |
| KR | 10-2011-0037622 A | 4/2011 |
| KR | 10-2011-0047596 A | 5/2011 |
| KR | 10-2011-0058743 A | 6/2011 |
| KR | 10-2011-0071480 A | 6/2011 |
| KR | 10-1058395 B1 | 8/2011 |
| KR | 10-2011-0103885 A | 9/2011 |
| KR | 10-2011-0104663 A | 9/2011 |
| KR | 10-2011-0130142 A | 12/2011 |
| KR | 10-1093721 B1 | 12/2011 |
| KR | 10-2012-0002366 A | 1/2012 |
| KR | 10-1127952 B1 | 3/2012 |
| KR | 10-1150719 B1 | 6/2012 |
| KR | 10-1168073 B1 | 7/2012 |
| KR | 10-2012-0136597 A | 12/2012 |
| KR | 10-1295325 B1 | 8/2013 |
| TW | 200907401 A | 2/2009 |
| TW | 201041985 A | 12/2010 |
| TW | 201105694 A | 2/2011 |
| TW | 201130880 A | 9/2011 |
| TW | 201202403 A | 1/2012 |
| TW | I357922 B | 2/2012 |
| WO | 2007-081186 A1 | 7/2007 |
| WO | 2007-121102 A1 | 10/2007 |
| WO | WO 2008-098872 A1 | 8/2008 |
| WO | 2009-050957 A1 | 4/2009 |
| WO | 2010-035764 A1 | 4/2010 |
| WO | 2011-013611 A | 2/2011 |
| WO | 2011/105532 A1 | 9/2011 |
| WO | 2012-026475 A1 | 3/2012 |
| WO | 2012/060145 A1 | 5/2012 |
| WO | 2012-066743 A1 | 5/2012 |
| WO | 2013/105656 A1 | 7/2013 |

OTHER PUBLICATIONS

Extended European Search Report dated Mar. 11, 2016, issued in European Patent Application No. 13830272.4, 7 pages.
Extended European Search Report dated Mar. 14, 2016, issued in European Patent Application No. 13830709.5, 9 pages.
Extended European Search Report dated Mar. 15, 2016, issued in European Patent Application No. 13830681.6, 10 pages.
Extended European Search Report dated Apr. 4, 2016, issued in European Patent Application No. 13830724.4, 11 pages.
Extended European Search Report dated Apr. 6, 2016, issued in European Patent Application No. 13831327.5, 8 pages.
Extended European Search Report dated Dec. 17, 2015, issued in European Patent Application No. 13797819.3, 12 pages.
Extended European Search Report dated Dec. 17, 2015, issued in European Patent Application No. 13797572.8, 10 pages.
Extended European Search Report dated Jan. 8, 2016, issued in European Patent Application No. 13796271.8, 7 pages.
Extended European Search Report dated Jan. 29, 2016, issued in European Patent Application No. 13830624.6, 9 pages.
Extended European Search Report dated Dec. 22, 2015, issued in European Patent Application No. 13798019.9, 9 pages.
Extended European Search Report dated Jan. 8, 2016, issued in European Patent Application No. 13798121.3, 6 pages.
Extended European Search Report dated Jan. 8, 2016, issued in European Patent Application No. 13798100.7, 7 pages.
Search Report issued in International Application No. PCT/KR2013/004809 dated Aug. 12, 2013, 5 pages.
Search Report issued in International Application No. PCT/KR2013/004804 dated Aug. 19, 2013, 5 pages.
Search Report issued in International Application No. PCT/KR2013/004805 dated Aug. 22, 2013, 5 pages.
Search Report issued in International Application No. PCT/KR2013/004798 dated Aug. 28, 2013, 6 pages.
Search Report issued in International Application No. PCT/KR2013/004807 dated Sep. 4, 2013, 7 pgs.
Search Report issued in International Application No. PCT/KR2013/004812, dated Sep. 12, 2013, 6 pages.
Shin-Nakamura Chemical Co., Ltd.; (2009); Product list; Retrieved from http://www.shin-nakamura.com/products/monomer-oligomer-07.html (2 pages).
Ciba TINUVIN 900 Light Stabilizer, Ciba Specialty Chemicals, 1997, pp. 1-3.

* cited by examiner

[Figure 1]
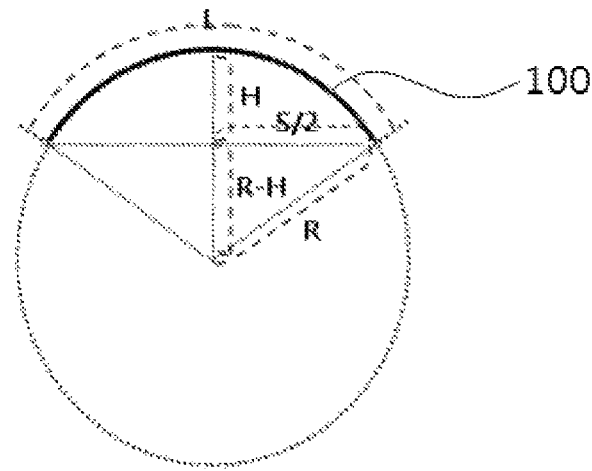
[Figure 2]
[Figure 3]
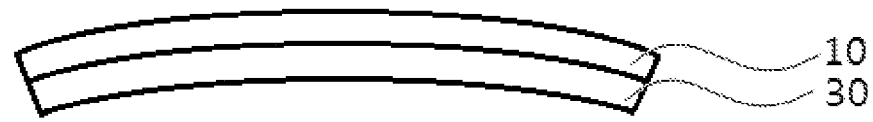

[Figure 4]
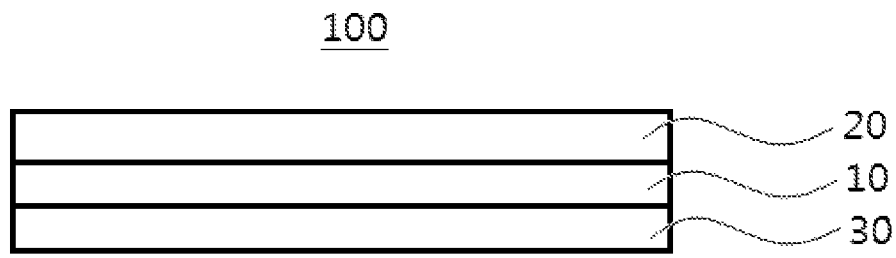
[Figure 5]
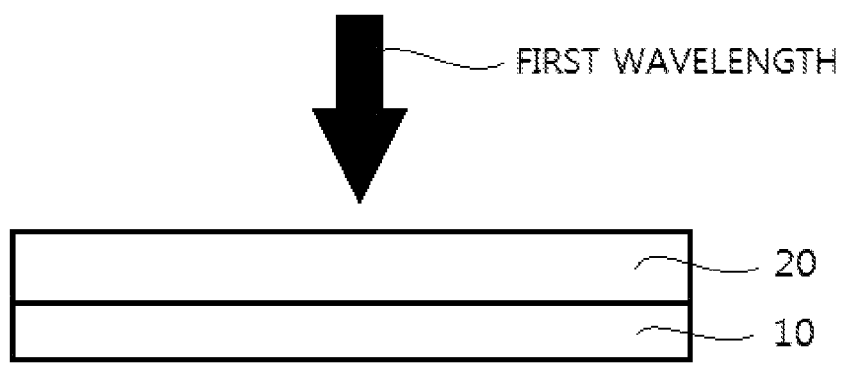
[Figure 6]
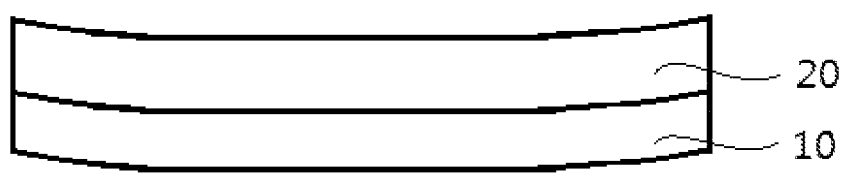

[Figure 7]
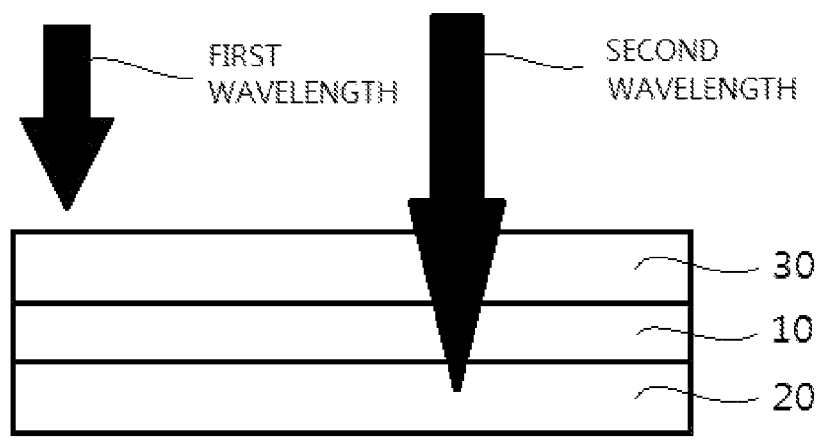

HARD COATING FILM AND PREPARATION METHOD THEREOF

CROSS REFERENCE TO RELATED APPLICATIONS

This application is a 35 U.S.C. §371 National Phase Entry Application from PCT/KR2013/004812, filed May 31, 2013, and designating the United States, which claims priority under 35 U.S.C. §119 to Korean Patent Application No. 10-2012-0058634, filed on May 31, 2012, Korean Patent Application No. 10-2012-0058635, filed on May 31, 2012, Korean Patent Application No. 10-2012-0058636, filed on May 31, 2012, Korean Patent Application No. 10-2012-0058637, filed on May 31, 2012, Korean Patent Application No. 10-2012-0092529, filed on Aug. 23, 2012, Korean Patent Application No. 10-2012-0092532, filed on Aug. 23, 2012, Korean Patent Application No. 10-2012-0092533, filed on Aug. 23, 2012, Korean Patent Application No. 10-2012-0093689, filed on Aug. 27, 2012, and to Korean Patent Application No. 10-2013-0062130, filed on May 30, 2013, which are incorporated herein by reference in their entireties.

TECHNICAL FIELD

The present invention relates to a hard coating film and a preparation method thereof, and, more particularly, to a high-hardness hard coating film, which is not easily curled, warped or cracked, and a method of preparing the same.

This application claims the benefits of Korean Patent Application Nos. 10-2012-0058634, filed on May 31, 2012, 10-2012-0058635, filed on May 31, 2012, 10-2012-0058636, filed on May 31, 2012, 10-2012-0058637, filed on May 31, 2012, 10-2012-0092529, filed on Aug. 23, 2012, 10-2012-0092532, filed on Aug. 23, 2012, 10-2012-0092533, filed on Aug. 23, 2012, 10-2012-0093689, filed on Aug. 27, 2012, and 10-2013-0062130, filed on May 30, 2013. The entire disclosures of the prior applications are hereby incorporated by references herein in its entirety into this application.

BACKGROUND ART

Recently, with the advance of mobile appliances such as smart phones, tablet PCs and the like, substrates for displays have been required to become thin or slim. Display windows or front panels of such mobile appliances are generally made of glass or reinforced glass which is a material having excellent mechanical properties. However, glass materials suffer from the disadvantage of making the mobile appliances heavy due to their own weight and being apt to be broken by external impacts.

As an alternative to glass, plastic resin films have been researched. A plastic resin film is suitable for the trend of pursuing lighter and slimmer mobile appliances because it is lightweight and does not easily break. Particularly, a film with high hardness and wear resistance is required. In this regard, it is proposed to have a structure in which the substrate is coated with a hard coating layer.

As a method of improving the surface hardness of a hard coating layer, a method of increasing the thickness of the hard coating layer may be considered. In order to ensure the surface hardness of the hard coating layer to such a degree that glass can be replaced by the hard coating layer, it is necessary to adjust the thickness of the hard coating layer. However, as the thickness of the hard coating layer increases, the surface hardness thereof may become higher, whereas the hard coating layer may be wrinkled or curled due to the curing shrinkage thereof and may be easily cracked or exfoliated. Therefore, it is not easy to put the hard coating layer to practical use.

Recently, there haven been proposed several methods of increasing the hardness of a hard coating film and solving the problem of the hard coating film being cracked or curled by the curing shrinkage thereof.

Korean Patent Application Publication No. 2010-0041992 discloses a hard coating film composition, free of monomers, using a binder resin including ultraviolet-curable polyurethane acrylate oligomers. However, this hard coating film has a pencil hardness of about 3H, which is not sufficient to alternate glass panels for displays.

DISCLOSURE

Technical Problem

Accordingly, the present invention has been devised to solve the above-mentioned problems, and an object of the present invention is to provide a high-hardness hard coating film, which is not easily curled, warped or cracked.

Another object of the present invention is to provide a method of preparing the hard coating film.

Technical Solution

In order to accomplish the above object, an aspect of the present invention provides a hard coating film, including: a supporting substrate; a first hard coating layer formed on one side of the supporting substrate; and a second hard coating layer formed on the other side of the supporting substrate, wherein the hard coating film satisfies the following Formula 4: $R/L \geq 20$, in which R is a curvature radius (unit: mm) of the hard coating film, and L is an arc length (unit: mm) of the hard coating film.

Another aspect of the present invention provides a method of preparing a hard coating film, comprising the steps of:

applying a first hard coating composition onto one side of a supporting substrate and photocuring the first hard coating composition to form a first hard coating layer, the first hard coating layer satisfying the following Formula 1; and applying a second hard coating composition onto the other side of the supporting substrate and photocuring the second hard coating composition to form a second hard coating layer, the second hard coating layer satisfying the following Formula 2, wherein the first and second hard coating layers satisfy the following Formula 3:

$$R1/L1 \geq 0.4 \quad (1)$$

$$R2/L2 \geq 0.4 \quad (2)$$

$$-0.05 \leq R1/L1 - R2/L2 \leq 0.05 \quad (3)$$

wherein R1 is a curvature radius (unit: mm) of the first hard coating layer, the curvature radius thereof being caused by a curing shrinkage of the first hard coating composition in one-side coating and curing of the first hard coating composition, and L1 is an arc length (unit: mm) of the first hard coating layer; and R2 is a curvature radius (unit: mm) of the second hard coating layer, the curvature radius thereof being caused by a curing shrinkage of the second hard coating composition in one-side coating and curing of the second hard coating composition, and L2 is an arc length (unit: mm) of the second hard coating layer.

Advantageous Effects

The hard coating film according to the present invention is advantageous in that it has high hardness and is not easily curled because it includes a thick hard coating layer.

Further, the hard coating film obtained by the method of the present invention is advantageous in that it can be usefully applied to front panels or display panels of mobile appliances, display devices, instruments and the like because it exhibits high hardness, high scratch resistance and high transparency and is not easily curled or cracked due to its high workability.

DESCRIPTION OF DRAWINGS

FIG. 1 is a schematic view showing the relationship of R value and L value of the hard coating film of the present invention.

FIG. 2 is a sectional view showing a supporting substrate coated with a first hard coating composition and the shrinkage due to curing.

FIG. 3 is a sectional view showing a supporting substrate coated with a second hard coating composition and the shrinkage due to curing.

FIG. 4 is a sectional view showing a hard coating film obtained by the method of the present invention.

FIGS. 5 to 7 are sectional views showing a process of preparing a hard coating film according to an embodiment of the present invention.

BEST MODE FOR CARRYING OUT THE INVENTION

In accordance with an aspect thereof, the present invention provides a hard coating film, including: a supporting substrate; a first hard coating layer formed on one side of the supporting substrate; and a second hard coating layer formed on the other side of the supporting substrate, wherein the hard coating film satisfies the following Formula 4: $R/L \geq 20$, in which R is a curvature radius (unit: mm) of the hard coating film, and L is an arc length (unit: mm) of the hard coating film.

In accordance with another aspect thereof, the present invention provides a method of preparing a hard coating film, including the steps of:

applying a first hard coating composition onto one side of a supporting substrate and photocuring the first hard coating composition to form a first hard coating layer, the first hard coating layer satisfying the following Formula 1; and applying a second hard coating composition onto the other side of the supporting substrate and photocuring the second hard coating composition to form a second hard coating layer, the second hard coating layer satisfying the following Formula 2, wherein the first and second hard coating layers satisfy the following Formula 3:

$$R1/L1 \geq 0.4 \quad (1)$$

$$R2/L2 \geq 0.4 \quad (2)$$

$$-0.05 \leq R1/L1 - R2/L2 \leq 0.05 \quad (3)$$

wherein R1 is a curvature radius (unit: mm) of the first hard coating layer, the curvature radius thereof being caused by a curing shrinkage of the first hard coating composition in one-side coating and curing of the first hard coating composition, and L1 is an arc length (unit: mm) of the first hard coating layer; and R2 is a curvature radius (unit: mm) of the second hard coating layer, the curvature radius thereof being caused by a curing shrinkage of the second hard coating composition in one-side coating and curing of the second hard coating composition, and L2 is an arc length (unit: mm) of the second hard coating layer.

In the present invention, the terms "first", "second" and the like are used to describe various constituents, only for the purpose of differentiating one constituent from another.

Further, the terms used in the present specification are used only to illustrate the present invention, and do not intend to limit the present invention. The singular number includes the plural number as long as they are apparently different from each other in context. In the present specification, the terms "include", "comprise", "have" and the like designate the existence of features, steps, constituents and combinations thereof, and must be understood that existence or addition of one or more other features, steps, constituents and combinations thereof is not previously excluded.

Further, in the present invention, when it is mentioned that each constituent is formed "on", "over" or "above" each constituent, it means that each constituent is directly formed on each constituent or that another constituent is additionally formed between layers, on an object or on a substrate.

Since the present invention may be modified in various forms, preferred embodiments of the present invention will be described in detail. Although these embodiments have been disclosed for illustrative purposes, it will be appreciated that the present invention is not limited thereto, and those skilled in the art will appreciate that various modifications, additions and substitutions are possible, without departing from the scope and spirit of the invention.

Hereinafter, preferred embodiments of the present invention will be described in detail with reference to the accompanying drawings.

An aspect of the present invention provides a hard coating film, including: a supporting substrate; a first hard coating layer formed on one side of the supporting substrate; and a second hard coating layer formed on the other side of the supporting substrate, wherein the hard coating film satisfies the following Formula 4: $R/L \geq 20$, in which R is a curvature radius (unit: mm) of the hard coating film, and L is an arc length (unit: mm) of the hard coating film.

FIG. 1 is a schematic view showing the relationship of R value and L value of the hard coating film of the present invention, the relationship thereof being represented by Formula 4 above.

FIG. 1 shows the relationship of R value and L value of the section of the hard coating film 100.

Referring to FIG. 1, when the section of the hard coating film 100 constitutes a part of circle due to a curl phenomenon, if a curvature radius of the circle is indicated by R, a maximum distance at which the hard coating film 100 is spaced apart from the plane is indicated by H and a length of chord in the circle is indicated by S, the relationship between R and H is represented by the following Equation 3:

$$R^2 = (R-H)^2 + (S/2)^2$$

$$R = (H/2) + (S^2/8H) \quad \text{[Equation 3]}$$

Therefore, the curvature radius R of the hard coating film can be calculated by the Equation 3 above after measuring H and S values. As R value increases, the hard coating film becomes flatter. Meanwhile, since the flatness of the hard coating film may be changed depending on the arc length (L) thereof, the ratio of R to L, that is, R/L may be used as an index indicating the flatness of the hard coating film.

The hard coating film includes first and second hard coating layers formed on both sides of the supporting substrate.

The hard coating film of the present invention is provided on both sides thereof with first and second hard coating layers. The ratio (R/L) of curvature radius (R) to arc length (L) of the hard coating film is more than 20.

According to an embodiment of the present invention, the ratio (R/L) may be 20 or more, 24 or more, or 30 or more. When the hard coating film is substantially completely flat, R becomes infinite, and thus the R/L value of the hard coating film of the present invention becomes infinite, too.

When the R/L value is more than 20, the hard coating film exhibits high flatness. For example, the maximum distance at which each edge of the hard coating film is spaced apart from the plane may be about 0.3 mm or less.

Further, the hard coating film of the present invention may have excellent impact resistance to such a degree that it can replace glass. For example, when a 22 g steel ball repeatedly free-falls onto the hard coating film of the present invention from a height of 50 cm ten times, the hard coating film of the present invention may not be cracked.

Further, the hard coating film of the present invention may have a pencil hardness of 7H or more, 8H or more or 9H or more under a load of 1 kg.

Further, when a friction tester is mounted with a steel wool #0000 and then the steel wool #0000 is reciprocated on the hard coating film of the present invention 400 times under a load of 500 g, two or less scratches may be formed on the hard coating film.

Further, the hard coating film of the present invention may have a light transmittance of 91.0% or more or 92.0% or more, and a haze of 1.0% or less, 0.5% or less, or 0.4% or less.

Further, the hard coating film of the present invention may have an initial color b* value of 1.0 or less. Further, when the hard coating film is exposed to UV-B for 72 hours or more by an ultraviolet lamp, the difference between the initial color b* value of the hard coating film and the color b* value of the hard coating film exposed to UV-B may be 0.5 or less or 0.4 or less.

Further, when the hard coating film of the present invention is exposed to a temperature of 50° C. or more and a humidity of 80% or more for 70 hours or more and then placed on a plane, the maximum distance at which each edge of the hard coating film is spaced apart from the plane may be about 1.0 mm or less, about 0.6 mm or less, or about 0.3 mm or less. More specifically, when the hard coating film is exposed to a temperature of 50 to 90° C. and a humidity of 80 to 90% for 70 to 100 hours or more and then placed on a plane, the maximum distance at which each edge of the hard coating film is spaced apart from the plane may be about 1.0 mm or less, about 0.6 mm or less, or about 0.3 mm or less.

In the hard coating film of the present invention, so long as it is transparent, any plastic resin, whether capable of being stretched or not, may be used for the supporting substrate which the first and the second hard coating layers will beformed on, without limitations imposed thereto. According to an embodiment of the present invention, the supporting substrate may include polyethyleneterephtalate (PET), a cyclic olefin copolymer (COC), polyacrylate (PAC), polycarbonate (PC), polyethylene (PE), polymethylmethacrylate (PMMA), polyetheretherketone (PEEK), polyethylenenaphthalate (PEN), polyetherimide (PEI), polyimide (PI), triacetylcellulose (TAC), methyl methacrylate (MMA) or the like. The supporting substrate may be a single layer structure, and, if necessary, may be a multilayer structure composed of the same or different materials, but is not particularly limited.

According to an embodiment of the present invention, the supporting substrate may be a multilayered substrate made of polyethyleneterephthalate (PET) or may be a multilayered substrate formed by the coextrusion of polymethylmethacrylate (PMMA) and polycarbonate (PC).

Further, according to an embodiment of the present invention, the supporting substrate may include a copolymer of polymethylmethacrylate (PMMA) and polycarbonate (PC).

The thickness of the supporting substrate may be, but is not limited to, about 30 to about 1,200 µm, or about 50 to about 800 µm.

Further, according to an embodiment of the present invention, the thickness ratio of the supporting substrate to the first hard coating layer or the second hard coating layer may be about 1:0.5 to about 1:2, or about 1:0.5 to about 1:1.5.

When the hard coating film of the present invention satisfies the above Formula 4: R/L≥20, the components of the first and second hard coating layers are not particularly limited. According to an embodiment of the present invention, each of the first and second hard coating layers may include a photocuarble crosslinked copolymer of tri- to hexa-functional acrylate-based monomers.

In the present specification, the term "acrylate-based" is intended to encompass acrylate, methacrylate, and derivatives thereof with various substituents.

Examples of the tri- to hexa-functional acrylate-based monomer may include trimethylolpropane triacrylate (TMPTA), trimethylolpropaneethoxy triacrylate (TMPEOTA), glycerin-propoxylated triacrylate (GPTA), pentaerythritol tetraacrylate (PETA), dipentaerythritol hexaacrylate (DPHA), and the like. These tri- to hexafunctional acrylate-based monomers may be used independently or in a combination thereof.

According to an embodiment of the present invention, each of the first and second hard coating layers, which may be identical or different, may independently include a photocurable crosslinked copolymer in which tri- to hexafunctional acrylate-based monomers are crosslink-polymerized with mono- to di-functional acrylate-based monomers.

Examples of the mono- to di-functional acrylate-based monomers may include hydroxyethyl acrylate (HEA), hydroxyethyl methacrylate (HEMA), hexanediol diacrylate (HDDA), tripropyleneglycol diacrylate (TPGDA), ethyleneglycol diacrylate (EGDA), and the like. These mono- to di-functional acrylate-based monomers may also be used independently or in a combination thereof.

When each of the first and second hard coating layers includes a photocurable crosslinked copolymer in which tri- to hexa-functional acrylate-based monomers are crosslink-polymerized with mono- to di-functional acrylate-based monomers, the content ratio of mono- to di-functional acrylate-based monomers to tri- to hexa-functional acrylate-based monomers is not particularly limited. According to an embodiment of the present invention, mono- to di-functional acrylate-based monomers and tri- to hexa-functional acrylate-based monomers may be included such that the weight ratio thereof may be about 1:99 to about 50:50, or about 10:90 to about 50:50, or about 20:80 to about 40:60. When mono- to di-functional acrylate-based monomers and tri- to hexa-functional acrylate-based monomers are included at the above weight ratio, the hard coating layer may be imparted with high hardness and flexibility without deteriorating other physical properties such as curl characteristics, light resistance and the like.

According to an embodiment of the present invention, each of the first and second hard coating layers, which may be identical or different, may independently include a photocurable crosslinked copolymer in which tri- to hexafunctional acrylate-based monomers are crosslink-polymerized with a photocurable elastic polymer.

In the present specification, the photocurable elastic polymer refers to a polymer material which is elastic and contains a functional group that can be crosslink-polymerized by UV irradiation.

According to an embodiment of the present invention, the photocurable elastic polymer may have an elongation of about 15% or more, for example, about 15 to about 200%, about 20 to about 200%, or about 20 to about 150%, as measured according to ASTM D638.

The photocurable elastic polymer is crosslink-polymerized with the tri- to hexa-functional acrylate-based monomers to form a first or second hard coating layer, which is improved in flexibility and impact resistance.

According to an embodiment of the present invention, the photocurable elastic polymer may be a polymer or oligomer having a weight average molecular weight of about 1,000 to about 600,000 g/mol or about 10,000 to about 600,000 g/mol.

The photocurable elastic polymer may be at least one selected from the group consisting of polycaprolactone, a urethane acrylate-based polymer, and polyrotaxane.

Among the polymers used as the photocurable elastic polymer, polycaprolactone is formed by the ring-opening polymerization of caprolactone, and has excellent physical properties such as flexibility, impact resistance, durability and the like.

The urethane acrylate-based polymer retains urethane bonds and has excellent elasticity and durability.

The polyrotaxane is a polymer of rotaxane, a mechanically-interlocked molecular architecture consisting of a dumbbell-shaped molecule which is threaded through a cyclic moiety (macrocycle). The two components of a rotaxane are kinetically trapped since the ends of the dumbbell (stoppers) are larger than the internal diameter of the ring and prevent disassociation of the components since this would require significant distortion of the covalent bonds.

According to an embodiment of the present invention, the photocurable elastic polymer may include polyrotaxane comprising a cyclic moiety (macrocycle) in which lactone compounds with a (meth)acrylate moiety conjugated to the end thereof are bonded each other; a thread moiety held within the macrocycle; and stoppers provided at both ends of the thread moiety so as to prevent dissociation of the macro cycle.

In this case, the cyclic moiety (macrocycle) may be used without limitation as long as it has a size to such degree that it surrounds the thread moiety. The cyclic moiety (macrocycle) may include a functional group such as a hydroxide group, an amino group, a carboxyl group, a thiol group, an aldehyde group or the like, which can react with other polymers or compounds. Specific examples of the cyclic moiety (macrocycle) may include α-cyclodextrin, β-cyclodextrin, γ-cyclodextrin and mixtures thereof.

Further, the thread moiety may be used without limitation as long as it is generally linear in shape with a predetermined weight or greater. Preferably, a polyalkylene compound or a polylactone compound may be used in the thread moiety. Specifically, a polyoxyalkylene compound including an oxyalkylene repetitive unit of 1 to 8 carbon atoms or a polylactone compound including a lactone repetitive unit of 3 to 10 carbon atoms may be used in the thread moiety.

Meanwhile, the stopper may be appropriately adjusted depending on the characteristics of the rotaxane compound to be prepared. For example, the stopper may be at least one selected from the group consisting of a dinitrophenyl group, a cyclodextrin group, an adamantane group, a trityl group, a fluorescein group and a pyrene group.

According to an embodiment of the present invention, when the first or second hard coating layer includes the photocuarble crosslinked copolymer further including the photocurable elastic polymer, the first or second hard coating layer can be imparted with high hardness and flexibility, and particularly, can be imparted with impact resistance absorbing external impact, thereby preventing a hard coating film from being damaged by external impacts.

According to an embodiment of the present invention, each of the first and second hard coating layers, which may be identical or different, may further include inorganic particles dispersed in the photocuarble crosslinked copolymer, independently.

According to an embodiment of the present invention, as the inorganic particles, inorganic nanoparticles having a particle size of about 100 nm or less, about 10 to about 100 nm or about 10 to about 50 nm may be used. For example, silica particles, aluminum oxide particles, titanium oxide particles or zinc oxide particles may be used as the inorganic particles.

Each of the first and second hard coating layers includes the inorganic particles, thus further improving the hardness of a hard coating film.

According to an embodiment of the present invention, when the first or second hard coating layer further includes inorganic particles, the content ratio of the photocuarble crosslinked copolymer to the inorganic particles is not particularly limited. However, according to an embodiment of the present invention, the photocuarble crosslinked copolymer and the inorganic particles may be included such that the weight ratio thereof is about 40:60 to about 90:10, or about 50:50 to about 80:20. When the photocuarble crosslinked copolymer and the inorganic particles are included at the above content ratio, the effect of improving the hardness of a hard coating film by the addition of inorganic particles can be attained without deteriorating the physical properties thereof.

Meanwhile, the first or second hard coating layer may further include commonly-used additives such as a surfactant, a yellowing inhibitor, a leveling agent, an antifouling agent and the like in addition to the above-mentioned photocuarble crosslinked polymer and inorganic particles. Here, the content of the additive is not particularly limited because the content thereof may be variously adjusted while not deteriorating the physical properties of the hard coating film of the present invention. For example, the additive may be included in an amount of about 0.1 to about 10 parts by weight, based on 100 parts by weight of the photocurable crosslinked copolymer.

According to an embodiment of the present invention, for example, the first or second hard coating layer may include a surfactant as an additive. The surfactant may be a mono- to di-functional fluorine-based acrylate, a fluorine-based surfactant or a silicon-based surfactant. In this case, the surfactant may be included in the form of it being dispersed in or crosslinked with the photocurable crosslinked copolymer.

As described above, the hard coating film of the present invention, satisfying the above Formula 4, can be usefully used in various fields because it exhibit high hardness, impact resistance, scratch resistance, transparency, durability, light resistance, light transmittance and the like. Particularly, the hard coating film of the present invention can be used in various fields requiring high hardness and excellent optical properties. For example, the hard coating film of the present invention can be used in touch panels of mobile terminals, smart phones or tablet PCs and covers of displays or devices.

Another aspect of the present invention provides a method of preparing a hard coating film, including the steps of: applying a first hard coating composition onto one side of a supporting substrate and photocuring the first hard coating composition to form a first hard coating layer, the first hard coating layer satisfying the following Formula 1; and applying a second hard coating composition onto the other side of the supporting substrate and photocuring the second hard coating composition to form a second hard coating layer, the second hard coating layer satisfying the following Formula 2, wherein the first and second hard coating layers satisfy the following Formula 3:

$$R1/L1 \geq 0.4 \quad (1)$$

$$R2/L2 \geq 0.4 \quad (2)$$

$$-0.05 \leq R1/L1 - R2/L2 \leq 0.05 \quad (3)$$

wherein R1 is a curvature radius (unit: mm) of the first hard coating layer, the curvature radius thereof being caused by a curing shrinkage of the first hard coating composition in one-side coating and curing of the first hard coating composition, and L1 is an arc length (unit: mm) of the first hard coating layer; and R2 is a curvature radius (unit: mm) of the second hard coating layer, the curvature radius thereof being caused by a curing shrinkage of the second hard coating composition in one-side coating and curing of the second hard coating composition, and L2 is an arc length (unit: mm) of the second hard coating layer.

Generally, a binder may cause a curing shrinkage phenomenon or curl phenomenon in which a substrate is rolled up together with a coating layer due to shrinkage attributable to curing. The curl phenomenon is a phenomenon in which the edge or the like of a planar film is curvilinearly warped or rolled up when the planar film is spread on a flat plate, and this curl phenomenon occurs when the binder is shrunk in the procedure of photocuring this binder by ultraviolet irradiation.

Particularly, in order to use a hard coating film in covers for mobile terminals such as smart phones or covers for tablet PCs, it is important that the hardness of a hard coating film is improved to such a degree that the hard coating film can replace glass. In this case, in order to improve the hardness of the hard coating film, basically, the thickness of a hard coating layer must be increased to predetermined thickness, for example, 50 μm or more, 70 μm or more or 100 μm or more. However, as the thickness of the hard coating layer is increased, the curl phenomenon caused by curing shrinkage is also increased, so the adhesion of the hard coating layer to the supporting substrate is decreased, and the hard coating film is easily rolled up. For this reason, a process of flattening the supporting substrate may be additionally performed, but this process is problematic in that the hard coating layer may be cracked. Therefore, it is not easy to prepare a hard coating film having high hardness that can replace glass without deteriorating the physical properties thereof.

However, according to the method of preparing a hard coating film of the present invention, when a first hard coating composition is applied onto one side of a supporting substrate and then photocured to form a first hard coating layer, the curl caused by the curing shrinkage of the first hard coating composition is adjusted at a predetermined level. Further, when a second hard coating composition is applied onto the other side of the supporting substrate and then photocured to form a second hard coating layer, the curl caused by the curing shrinkage of the first hard coating composition is set off in a direction opposite thereto, thereby forming a flat hard coating film without forming curl or cracks.

That is, in the step of applying and photocuring a first hard coating composition onto one side of a supporting substrate, when the curvature radius (unit: mm) of a first hard coating layer, the curvature radius thereof being caused by the curing shrinkage of the cured first hard coating composition, is indicated by R1, and the arc length (unit: mm) of the first hard coating layer is indicated by L1, the R1 and L1 satisfies the following Formula 1:

$$R1/L1 \geq 0.4 \quad (1)$$

According to an embodiment of the present invention, the R1/L1 may be 0.5 or more, 0.6 or more, or 0.7 or more.

Further, next, in the step of applying and photocuring a second hard coating composition onto the other side of a supporting substrate, when the curvature radius (unit: mm) of the second hard coating layer, the curvature radius thereof being caused by the curing shrinkage of the cured second hard coating composition in one-side coating and curing of the second hard coating composition, is indicated by R2, and the arc length (unit: mm) of the second hard coating layer is indicated by L2, the R2 and L2 satisfies the following Formula 2:

$$R2/L2 \geq 0.4 \quad (2)$$

According to an embodiment of the present invention, the R2/L2 may be 0.5 or more, 0.6 or more, or 0.7 or more.

Further, the first and second hard coating layers satisfy the following Formula 3:

$$-0.05 \leq R1/L1 - R2/L2 \leq 0.05 \quad (3)$$

In the Formula 3, R1, L1, R2 and L2 were defined in the Formulae 1 and 2.

The finally-obtained hard coating film provided with the first and second hard coating layers satisfies the following Formula 4:

$$R/L \geq 20 \quad (4)$$

In the Formula 4, R is a curvature radius (unit: mm) of the hard coating film, and L is an arc length (unit: mm) of the hard coating film.

As described above, at the time of one-side coating on the supporting substrate and photocuring, first and second hard coating layers may be formed such that the curl caused by the curing shrinkage of first and second hard coating compositions is formed at a predetermined level or less, and the difference in curl between the first and second coating layers is adjusted, and thus finally-obtained hard coating film is hardly curled.

FIG. 2 is a sectional view showing a supporting substrate coated with a first hard coating composition and the shrinkage of the supporting substrate due to curing.

Referring to FIG. 2, when a first hard coating layer 20 is formed by applying a first hard coating composition on one side of a supporting substrate 10 and curing the first hard coating composition, the edge or side of the first hard coating layer 20 is curved or spaced apart from a plane due to a curing shrinkage. As such, in the case where the section of the first hard coating layer 20 constitutes a part of circle due to a curl phenomenon, when the maximum distance at which the first hard coating layer 20 is spaced apart from the plane is indicated by H1, and the chord length of the first hard coating layer is indicated by S1, the curvature radius R1 of the first hard coating layer 20 may be calculated by the following Equation 1:

$$R_1 = (H_1/2) + (S_1^2/8H_1) \quad [\text{Equation 1}]$$

The first hard coating layer 20 is formed such that R1/L1, which is obtained by dividing R1 by L1 (arc length of first hard coating layer) is 0.4 or more.

As such, according to the method of present invention, when the first hard coating layer 20 is formed, the curl caused by the curing shrinkage of the first hard coating composition is adjusted at a predetermined level or less.

At the time of forming the first hard coating layer 20, when R1/L1 is less than 0.4 (not satisfying the Formula 1), the first hard coating layer 20 may be severely curled, so the curl caused by the curing shrinkage of the first hard coating composition is not sufficiently set off during the procedure of applying and photocuring a second hard coating composition on the other side of a supporting substrate, or the first hard coating layer 20 may be entirely warped.

Next, a second hard coating composition is applied onto the other side of the supporting substrate provided on one side thereof with the first hard coating layer, and is then photocured to form a second hard coating layer. In this case, the second hard coating layer satisfies the following Formula 2:

$$R2/L2 \geq 0.4 \quad (2)$$

In the Formula 2, R2 is a curvature radius (unit: mm) of the second hard coating layer, the curvature radius thereof being caused by a curing shrinkage of the second hard coating composition in one-side coating and curing of the second hard coating composition, and L2 is an arc length (unit: mm) of the second hard coating layer.

Further, the first and second hard coating layers satisfy the following Formula 3:

$$-0.05 \leq R1/L1 - R2/L2 \leq 0.05 \quad (3)$$

In the Formula 3, R1, L1, R2 and L2 were defined in the Formulae 1 and 2.

FIG. 3 is a sectional view showing a supporting substrate coated with a second hard coating composition and the shrinkage of the supporting substrate due to curing.

Referring to FIG. 3, when a second hard coating layer 30 is formed by applying a second hard coating composition on the other side of the supporting substrate 10 and curing the second hard coating composition, the edge or side of the second hard coating layer 30 is curved or spaced apart from a plane due to a curing shrinkage. When the maximum distance at which the second hard coating layer 30 is spaced apart from the plane is indicated by H2, and the chord length of the second hard coating layer 30 is indicated by S2, the curvature radius R2 of the second hard coating layer 30 may be calculated by the following Equation 2:

$$R_2 = (H_2/2) + (S_2^2/8H_2) \quad \text{[Equation 2]}$$

The second hard coating layer 30 is formed such that R2/L2, which is obtained by dividing R2 by L2 (arc length of second hard coating layer) is 0.4 or more.

Further, when the first and second hard coating layers are formed such that the absolute value of difference between R1/L1 and R2/L2 is 0.05 or less, the curl caused by the curing shrinkage of the first hard coating layer is set off by the curing shrinkage of the second hard coating layer, thus obtaining a flat hard coating film.

At the time of forming the second hard coating layer, when R2/L2 is less than 0.4 (not satisfying the Formula 2) or the absolute value of difference between R1/L1 and R2/L2 is more than 0.05 (not satisfying the Formula 3), the curl caused by the curing shrinkage of the first hard coating layer may be not sufficiently set off, thus reducing the flatness of the finally-obtained hard coating film.

Therefore, the finally-obtained hard coating film provided with the first and second hard coating layers satisfy the following Formula 4:

$$R/L \geq 20 \quad (4)$$

In the Formula 4, R is a curvature radius (unit: mm) of the hard coating film, and L is an arc length (unit: mm) of the hard coating film.

FIG. 4 is a sectional view showing a hard coating film obtained by the method of the present invention.

Referring to FIG. 4, a first hard coating layer 20 is formed on one side of a supporting substrate 10, and a second hard coating layer 30 is formed on the other side thereof. At the time of forming the first hard coating layer 20, curl is formed due to curing shrinkage, but degree of curl is adjusted at a predetermined level, and at the time of forming the second hard coating layer 30, the curl caused by the formation of the first hard coating layer 20 is set off in a direction opposite thereto, thereby obtaining a flat hard coating film 100.

The method of preparing the hard coating film satisfying the above Formulae 1 to 3 according to the present invention can be realized by adjusting the components of the first and second hard coating compositions, the thickness of first and second hard coating layers and the conditions of photocuring.

According to an embodiment of the present invention, first and second hard coating layers satisfying the above Formulae 1 to 3 may be formed as follows.

First, a first hard coating layer is formed on one side of a supporting substrate. In this case, the method of applying the first hard coating composition is not particularly limited as long as it can be used in the related field. For example, the first hard coating composition may be applied by bar coating, knife coating, roll coating, blade coating, die coating, micro-gravure coating, comma coating, slot die coating, lip coating, solution casting or the like. Further, the first hard coating composition may be applied onto one side of the supporting substrate such that a first hard coating layer formed by completely curing the applied first hard coating composition has a thickness of about 50 to about 300 μm or about 50 to about 150 μm or about 70 to about 100 μm. When the first hard coating composition is applied as above, a hard coating film having high hardness can be prepared.

Next, the applied first coating composition is irradiated with ultraviolet having a first wavelength to photocure the first hard coating composition.

The ultraviolet having a first wavelength may be a short-wavelength ultraviolet having a wavelength of about 280 to less than about 320 nm.

The procedure of photocuring the first hard coating composition may be performed until a part of the binder included in the first hard coating composition is crosslinked. Here, the sentence "a part of the binder is crosslinked" means that the binder is partially crosslinked at a ratio of less than 100% when the case that the binder is completely crosslinked is indicated by 100%. For example, according to an embodiment of the present invention, the procedure of photocuring the first hard coating composition may be performed until about 30 to about 60 mol % or about 40 to about 50 mol % of photocurable functional groups included in the binder are crosslinked.

The degree of crosslinkage of the binder may be evaluated by measuring the number of moles of functional groups, that is, double bonds (C=C) remaining in the binder using infrared (IR) after photocuring the first hard coating composition and then comparing it with the amount of functional groups included in the binder before photocuring the first hard coating composition.

As described above, in the step of irradiating one side of the supporting substrate coated with the first coating composition with ultraviolet having a first wavelength to photocure the first coating composition, the binder of the first hard coating composition is not completely cured at once but partially cured until about 30 to about 60 mol % of the binder is cured, thereby reducing the curing shrinkage of the first hard coating composition. Therefore, a first hard coating layer satisfying the above Formula 1 can be prepared.

For example, the irradiation rate of the ultraviolet having a first wavelength may be about 20 to about 600 mJ/cm² or about 50 to about 500 mJ/cm². The light source for ultraviolet irradiation is not particularly limited as long as it can be used in the related field. For example, as the light source of ultraviolet irradiation, a high-pressure mercury lamp, a metal halide lamp, a black light lamp, a fluorescent lamp or the like may be used. When the applied first hard coating composition is irradiated with ultraviolet at the above irradiation rate for about 30 seconds to about 15 minutes or for about 1 to about 10 minutes, this first hard coating composition may be photocured.

Next, a second hard coating composition is applied onto the other side of the supporting substrate.

In this case, the method of applying the second hard coating composition is not particularly limited as long as it can be used in the related field. For example, the second hard coating composition may be applied by bar coating, knife coating, roll coating, blade coating, die coating, microgravure coating, comma coating, slot die coating, lip coating, solution casting or the like.

Further, the second hard coating composition may be applied onto one side of the supporting substrate such that a second hard coating layer formed by completely curing the applied second hard coating composition has a thickness of about 50 to about 300 μm, about 50 to about 150 μm, or about 70 to about 100 μm. When the second hard coating composition is applied as above, a hard coating film having high hardness can be prepared.

After the second hard coating composition is applied, the procedure of stabilizing the surface of the applied second hard coating composition may be selectively performed. This stabilization procedure may be performed by heat-treating the supporting substrate coated with the second hard coating composition at predetermined temperature. Thus, the surface of the applied second hard coating composition is flattened, and volatile components included in the second hard coating composition are volatilized, thus stabilizing the surface thereof.

Subsequently, the other side of the supporting substrate coated with the second coating composition is irradiated with ultraviolet having both first wavelength and second wavelength longer than the first length to photocure the second coating composition. According to an embodiment of the present invention, the first wavelength may be about 280 to less than about 320 nm, and the second wavelength may be about 320 to about 400 nm.

The ultraviolet having a first wavelength photocures the second hard coating composition, and simultaneously the ultraviolet having a second wavelength higher than the first wavelength penetrates the supporting substrate coated with the second hard coating composition to reaches the first hard coating composition located opposite to the second hard coating composition to photocure the first hard coating composition. In this case, the first hard coating composition partially photocured in the above first photocuring step may be completely photocured by the second photocuring step. Further, in the second photocuring step, the irradiation of ultraviolet is conducted from a side opposite to the side of the supporting substrate coated with the first hard coating composition, and thus curls formed due to the curing contraction in the first photocuring step are set off in a direction opposite to the first hard coating composition, thus obtaining a flat hard coating film. Therefore, a second hard coating layer satisfying the above Formulae 2 and 3 can be formed.

As described above, according to the method of preparing a hard coating film of the present invention, two-step photocuring process including the steps of: partially photocuring the binder of the first hard coating composition applied on one side of the supporting substrate; and photocuring the binder of the second hard coating composition applied on the other side of the supporting substrate and photocuring the residual uncured binder of the first hard coating composition is performed, thus forming first and second hard coating layers satisfying the above Formulae 1 to 3.

Moreover, when the two-step photocuring process is performed, it is possible to prevent the curls or cracks occurring when a hard coating composition is applied thickly. Therefore, a hard coating film exhibiting excellent physical and optical properties can be prepared without the formation of curls or cracks In the method of preparing a hard coating film according to the present invention, so long as it is transparent, any plastic resin, whether capable of being stretched or not, may be used for the supporting substrate which will be coated at both sides with the hard coating composition, without limitations imposed thereto. According to an embodiment of the present invention, the supporting substrate may include polyethyleneterephtalate (PET), a cyclic olefin copolymer (COC), polyacrylate (PAC), polycarbonate (PC), polyethylene (PE), polymethylmethacrylate (PMMA), polyetheretherketone (PEEK), polyethylenenaphthalate (PEN), polyetherimide (PEI), polyimide (PI), triacetylcellulose (TAC), methyl methacrylate (MMA) or the like. The supporting substrate may be a single layer structure, and, if necessary, may be a multilayer structure composed of the same or different materials, but is not particularly limited.

According to an embodiment of the present invention, the supporting substrate may be a multilayered substrate made of polyethyleneterephthalate (PET) or may be a multilayered substrate formed by the coextrusion of polymethylmethacrylate (PMMA) and polycarbonate (PC).

Further, according to an embodiment of the present invention, the supporting substrate may include a copolymer of polymethylmethacrylate (PMMA) and polycarbonate (PC).

The thickness of the supporting substrate may be, but is not limited to, about 30 to about 1,200 μm, or about 50 to about 800 μm.

The components of the first hard coating composition, which is applied onto one side of the supporting substrate, is not particularly limited as long as it satisfies the above Formulae 1 to 3. The first hard coating composition includes a first binder and a first photoinitiator such that the photocuring thereof can be conducted by ultraviolet.

According to an embodiment of the present invention, the first binder may include a tri- to hexa-functional acrylate-based monomer.

Examples of the tri- to hexa-functional acrylate-based monomer may include trimethylolpropane triacrylate (TMPTA), trimethylolpropaneethoxy triacrylate (TMPEOTA), glycerin-propoxylated triacrylate (GPTA), pentaerythritol tetraacrylate (PETA), dipentaerythritol hexaacrylate (DPHA), and the like. These tri- to hexa-functional acrylate-based monomers may be used independently or in a combination thereof.

According to an embodiment of the present invention, the first binder may further include a mono- to di-functional acrylate-based monomer.

Examples of the mono- to di-functional acrylate-based monomers may include hydroxyethyl acrylate (HEA), hydroxyethyl methacrylate (HEMA), hexanediol diacrylate (HDDA), tripropyleneglycol diacrylate (TPGDA), ethyleneglycol diacrylate (EGDA), and the like. These mono- to di-functional acrylate-based monomers may also be used independently or in a combination thereof.

Further, in first the hard coating composition, when the first binder further includes mono- to di-functional acrylate-based monomers, the content ratio of mono- to di-functional acrylate-based monomers to tri- to hexa-functional acrylate-based monomers is not particularly limited. According to an embodiment of the present invention, mono- to di-functional acrylate-based monomers and tri- to hexa-functional acrylate-based monomers may be included such that the weight ratio thereof may be about 1:99 to about 50:50, about 10:90 to about 50:50, or about 20:80 to about 40:60. When mono- to di-functional acrylate-based monomers and tri- to hexa-functional acrylate-based monomers are included at the above weight ratio, the hard coating layer may be imparted with high hardness and flexibility without deteriorating other physical properties such as curl characteristics, light resistance and the like.

According to an embodiment of the present invention, the first binder may further include a photocurable elastic polymer.

In the present specification, the photocurable elastic polymer refers to a polymer material which is elastic and contains a functional group that can be crosslink-polymerized by UV irradiation.

According to an embodiment of the present invention, the photocurable elastic polymer may have an elongation of about 15% or more, for example, about 15 to about 200%, about 20 to about 200% or about 20 to about 150%, as measured according to ASTM D638.

When the first binder further includes a photocurable elastic polymer, the photocurable elastic polymer is crosslink-polymerized with the tri- to hexa-functional acrylate-based monomers and then cured to form a hard coating layer, which is improved in flexibility and impact resistance.

When the first binder further includes a photocurable elastic polymer, the content ratio of the photocurable elastic polymer to the tri- to hexa-functional acrylate-based monomer is not particularly limited. However, according to an embodiment of the present invention, the photocurable elastic polymer and the tri- to hexa-functional acrylate-based monomer may be included such that the weight ratio thereof may be about 5:95 to about 20:80. When the photocurable elastic polymer and the tri- to hexa-functional acrylate-based monomer are included at the above weight ratio, the hard coating layer may be imparted with high hardness and flexibility without deteriorating other physical properties such as curl characteristics, light resistance and the like, and, particularly, it is possible to prevent the hard coating layer from being damaged by external impact, thus assuring excellent impact resistance.

According to an embodiment of the present invention, the photocurable elastic polymer may be a polymer or oligomer having a weight average molecular weight of about 1,000 to about 600,000 g/mol or about 10,000 to about 600,000 g/mol.

The photocurable elastic polymer may be at least one selected from the group consisting of polycaprolactone, a urethane acrylate-based polymer, and polyrotaxane.

Among the polymers used as the photocurable elastic polymer, polycaprolactone is formed by the ring-opening polymerization of caprolactone, and has excellent physical properties such as flexibility, impact resistance, durability and the like.

The urethane acrylate-based polymer retains urethane bonds to have excellent elasticity and durability.

The polyrotaxane is a polymer of rotaxane, a mechanically-interlocked molecular architecture consisting of a dumbbell-shaped molecule which is threaded through a cyclic moiety (macrocycle). The two components of a rotaxane are kinetically trapped since the ends of the dumbbell (stoppers) are larger than the internal diameter of the ring and prevent disassociation of the components since this would require significant distortion of the covalent bonds.

According to an embodiment of the present invention, the photocurable elastic polymer may include polyrotaxane comprising a cyclic moiety (macrocycle) in which lactone compounds with a (meth)acrylate moiety conjugated to the end thereof are bonded each other; a thread moiety held within the macrocycle; and stoppers provided at both ends of the thread moiety so as to prevent dissociation of the macro cycle.

In this case, the cyclic moiety (macrocycle) may be used without limitation as long as it has a size to such degree that it surrounds the thread moiety. The cyclic moiety (macrocycle) may include a functional group such as a hydroxide group, an amino group, a carboxyl group, a thiol group, an aldehyde group or the like, which can react with other polymers or compounds. Specific examples of the cyclic moiety (macrocycle) may include α-cyclodextrin, β-cyclodextrin, γ-cyclodextrin and mixtures thereof.

Further, the thread moiety may be used without limitation as long as it is generally linear in shape with a predetermined weight or greater. Preferably, a polyalkylene compound or a polylactone compound may be used in the thread moiety. Specifically, a polyoxyalkylene compound including an oxyalkylene repetitive unit of 1 to 8 carbon atoms or a polylactone compound including a lactone repetitive unit of 3 to 10 carbon atoms may be used in the thread moiety.

Meanwhile, the stopper may be appropriately adjusted depending on the characteristics of the rotaxane compound to be prepared. For example, the stopper may be at least one selected from the group consisting of a dinitrophenyl group, a cyclodextrin group, an amantane group, a trilyl group, a fluorescein group and a pyrene group.

Since the polyrotaxane compound has excellent scratch resistance, it can exhibit self-recovery ability when it is externally damaged.

The first hard coating composition may further include inorganic particles. In this case, the inorganic particles may be included in the form of being dispersed in the first binder.

According to an embodiment of the present invention, as the inorganic particles, inorganic nanoparticles having a particle size of about 100 nm or less, about 10 to about 100 nm or about 10 to about 50 nm may be used. For example, silica particles, aluminum oxide particles, titanium oxide particles or zinc oxide particles may be used as the inorganic particles.

The first hard coating composition includes the inorganic particles, thus further improving the hardness of a hard coating film.

According to an embodiment of the present invention, when the first hard coating composition further includes inorganic particles, the content ratio of the first binder to the inorganic particles is not particularly limited. However, according to an embodiment of the present invention, the first binder and the inorganic particles may be included such that the weight ratio thereof is about 50:50 to about 90:10, or about 60:40 to about 80:20. When the first binder and the inorganic particles are included at the above content ratio, the effect of improving the hardness of a hard coating film by the addition of inorganic particles can be attained without deteriorating the physical properties thereof.

In the method of preparing a hard coating film according to the present invention, the first hard coating composition includes a first photoinitiator.

The first photoinitiator may be selectively used depending on the wavelength band to be absorbed. According to an embodiment of the present invention, the first photoinitiator may be used in the form of a mixture including all materials that can absorb ultraviolet having a first wavelength band used in the above first photocuring procedure and ultraviolet having a second wavelength band used in the above second photocuring procedure to initiate photopolymerization. Further, according to an embodiment of the present invention, the first photoinitiator may be a photoinitiator that can absorb both ultraviolet having a first wavelength band and ultraviolet having a second wavelength.

More specifically, examples of the photoinitiator absorbing ultraviolet having a first wavelength band may include 1-hydroxy-cyclohexyl-phenyl ketone, 2-hydroxy-2-methyl-1-phenyl-1-propanone, 2-hydroxy-1-[4-(2-hydroxyethoxyl) phenyl]-2-methyl-1-propanone, methylbenzoylformate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone, and the like. Further, examples of commercially available photoinitiators may include Irgacure 184, Irgacure 500, Irgacure 651, Irgacure 369, Irgacure 907, Darocur 1173, Darocur MBF, and the like.

Examples of the photoinitiator absorbing ultraviolet having a second wavelength band may include diphenyl(2,4,6-trimethylbenzoyl)-phosphine oxide, bis(2,4,6-trimethylbenzoyl)-phenylphophine oxide, and the like. Further, examples of commercially available photoinitiators may include Irgacure 189, Irgacure 907, Esacure KIP 100F, and the like.

The mixing ratio of the photoinitiator absorbing ultraviolet having a first wavelength band to the photoinitiator absorbing ultraviolet having a second wavelength band is not particularly limited, and may be suitably adjusted at need.

Among these photoinitiators, Darocur TPO, Irgacure 500, Irgacure 907 and Esacure KIP 100F can absorb both ultraviolet having a first wavelength band and ultraviolet having a second wavelength. Therefore, they may be each independently used.

According to an embodiment of the present invention, the first photoinitiator may be included in an amount of about 0.5 to about 10 parts by weight or about 1 to about 5 parts by weight, based on 100 parts by weight of the first hard coating composition. When the amount of the first photoinitiator is present in the above range, crosslink-photopolymerization can be sufficiently conducted without deteriorating the physical properties of the hard coating film.

Meanwhile, in the method of preparing a hard coating film according to the present invention, the first hard coating composition may further include commonly-used additives such as a surfactant, a yellowing inhibitor, a leveling agent, an antifouling agent and the like in addition to the above-mentioned components. Here, the content of the additive is not particularly limited because the content thereof may be variously adjusted while not deteriorating the physical properties of the first hard coating composition.

According to an embodiment of the present invention, for example, the first hard coating composition may include a surfactant as an additive. The surfactant may be a mono- to di-functional fluorine-based acrylate, a fluorine-based surfactant or a silicon-based surfactant. Further, the first hard coating composition may include a yellowing inhibitor as an additive. The yellowing inhibitor may be a benzophenone compound or a benzotriazole compound.

Further, in the method of preparing a hard coating film according to the present invention, the first hard coating composition may be used in a solvent-free form, but may further include an organic solvent selectively in order to adjust the viscosity and fluidity of the first hard coating composition at the time of coating the supporting substrate with this composition and to improve the coatability of this composition to the supporting substrate.

Examples of the organic solvent may include: alcohols such as methanol, ethanol, isopropyl alcohol, butanol and the like; alkoxy alcohols such as 2-methoxy ethanol, 2-ethoxy ethanol, 1-methoxy-2-propanol and the like; ketones such as acetone, methyl ethyl ketone, methyl isobutyl ketone, methyl propyl ketone, cyclohexanone and the like; ethers such as propyleneglycol monopropyl ether, propyleneglycol monomethyl ether, ethyleneglyco monoethyl ether, ethyleneglycol monopropyl ether, ethyleneglycol monobutyl ether, diethyleneglycol monomethyl ether, diethyleneglycol monoethyl ether, diethyleneglycol monopropyl ether, diethyleneglycol monobutyl ether, diethyleneglycol-2-ethylhexyl ether and the like; and aromatic solvents such as benzene, toluene, xylene and the like. These organic solvents may be used independently or in a mixture thereof.

In the method of preparing a hard coating film according to the present invention, when the organic solvent is additionally included in the first hard coating composition, the organic solvent may be added such that the weight ratio of first hard coating composition:organic solvent is about 70:30 to about 99:1. As such, when the first hard coating composition has a high solid content, the viscosity of the first hard coating composition increases, and thus thick coating can be performed, thereby forming a thick hard coating layer having a thickness of 50 μm or more.

According to an embodiment of the present invention, the viscosity of the first hard coating composition is not particularly limited as long as it has suitable fluidity and coatability, but the first hard coating composition can exhibit high viscosity because it has a relatively high solid content. For example, the first hard coating composition may have a viscosity of about 100 to about 1,200 cps, about 150 to about 1,200 cps or about 300 to about 1,200 cps at 25° C.

The components of the second hard coating composition, which is applied onto the other side of the supporting substrate, are not particularly limited as long as it satisfies the above Formulae 1 to 3. The first hard coating composition includes a second binder and a second photoinitiator such that the photocuring thereof can be conducted by ultraviolet.

According to an embodiment of the present invention, the second binder may include a tri- to hexa-functional acrylate-based monomer.

According to an embodiment of the present invention, the second binder may further include a mono- to di-functional acrylate-based monomer in addition to the tri- to hexa-functional acrylate-based monomer.

According to an embodiment of the present invention, the second binder may further include a photocuarble elastic polymer in addition to the tri- to hexa-functional acrylate-based monomer.

Detailed descriptions of the tri- to hexa-functional acrylate-based monomer, mono- to di-functional acrylate-based monomer and photocurable elastic polymer are the same as those in the first hard coating composition. The tri- to hexa-functional acrylate-based monomer, mono- to di-functional acrylate-based monomer and photocurable elastic polymer included in the second hard coating composition may be the same as or different from those included in the first hard coating composition.

In the method of preparing a hard coating film according to the present invention, the second hard coating composition includes a second photoinitiator.

The second photoinitiator may be used without limitation as long as it can absorb the ultraviolet having a first wavelength band used in the above step of photocuring the first hard coating composition. More specifically, examples of the photoinitiator absorbing ultraviolet having a first wavelength band may include 1-hydroxy-cyclohexyl-phenyl ketone, 2-hydroxy-2-methyl-1-phenyl-1-propanone, 2-hydroxy-1-[4-(2-hydroxyethoxyl)phenyl]-2-methyl-1-propanone, methylbenzoylformate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone, and the like. Further, examples of commercially available photoinitiators may include Irgacure 184, Irgacure 500, Irgacure 651, Irgacure 369, Irgacure 907, Darocur 1173, Darocur MBF, and the like.

Further, Darocur TPO, Irgacure 500, Irgacure 907 or Esacure KIP 100F, which can absorb both ultraviolet having a first wavelength band and ultraviolet having a second wavelength, may be used as the second photoinitiator.

According to an embodiment of the present invention, the second photoinitiator may be included in an amount of about 0.5 to about 10 parts by weight or about 1 to about 5 parts by weight, based on 100 parts by weight of the second hard coating composition. When the amount of the second photoinitiator is present in the above range, crosslink-photopolymerization can be sufficiently conducted without deteriorating the physical properties of a hard coating film.

The second hard coating composition may further include inorganic particles.

Detailed description of the inorganic particles is the same as that mentioned in the first hard coating composition. The inorganic particles included in the second hard coating composition may be the same as or different from those included in the first hard coating composition.

Further, the second hard coating composition may further include commonly-used additives such as a surfactant, a yellowing inhibitor, a leveling agent, an antifouling agent and the like in addition to the above-mentioned components. Here, the content of the additive is not particularly limited because the content thereof may be variously adjusted without deteriorating the physical properties of the second hard coating composition.

Detailed description of the additives is the same as that mentioned in the first hard coating composition. The additives included in the second hard coating composition may be the same as or different from those included in the first hard coating composition.

The second hard coating composition may further include an organic solvent selectively in order to adjust the viscosity and fluidity thereof at the time of coating the supporting substrate with this composition and to improve the coatability of this composition to the supporting substrate.

Further, in the method of preparing a hard coating film according to the present invention, the second hard coating composition may be used in a solvent-free form, but may further include an organic solvent selectively in order to adjust the viscosity and fluidity thereof at the time of coating the supporting substrate with this composition and to improve the coatability of this composition to the supporting substrate.

Detailed description of the organic solvents is the same as that mentioned in the first hard coating composition. These organic solvents may be the same as or different from those included in the first hard coating composition.

According to an embodiment of the present invention, the second hard coating composition, the same as the first hard coating composition, may have a viscosity of about 100 to about 1,200 cps, or about 150 to about 1,200 cps, or about 300 to about 1,200 cps at 25° C.

As described above, according to the method of preparing a hard coating film of the present invention, in the step of applying and photocuring a first hard coating composition onto one side of a supporting substrate, when a first hard coating layer is formed such that the ratio (R1/L1) of the curvature radius (R1) of the first hard coating layer to the arc length (L1) of the first hard coating layer is 0.4 or more, the curl caused by the curing shrinkage of the first hard coating composition is adjusted at a predetermined level or less, thus minimizing the occurrence of curl.

Further, in the step of applying and photocuring a second hard coating composition onto the other side of the supporting substrate, when a second hard coating layer is formed such that the ratio (R2/L2) of the curvature radius (R2) of the second hard coating layer to the arc length (L2) of the second hard coating layer is 0.4 or more and the absolute value of difference between R1/L1 and R2/L2 is 0.05 or less, the curl caused by the first hard coating layer is sufficiently set off in a direction opposite thereto, thus improving the flatness of a flat hard coating film.

Therefore, it is possible to prevent the occurrence of curl or crack due to the curing shrinkage of first and second hard coating compositions even when they are applied thickly, thereby preparing a hard coating film exhibiting high hardness and excellent physical and optical properties without forming curl or crack.

The hard coating film obtained by the method of the present invention may satisfy the above Formula 4.

FIGS. 5 to 7 are sectional views showing a process of preparing a hard coating film according to an embodiment of the present invention.

FIG. 5 is a sectional view showing the step of irradiating one side of a supporting substrate 10 coated with a first hard coating composition with ultraviolet having a first wavelength to photocure the first hard coating composition.

Referring to FIG. 5, first, a first hard coating composition is applied onto one side of a supporting substrate 10 to form a first hard coating layer 20.

Detailed description of components of the first hard coating composition was aforementioned.

The method of applying the first hard coating composition is not particularly limited as long as it can be used in the related field. For example, the first hard coating composition may be applied by bar coating, knife coating, roll coating, blade coating, die coating, micro-gravure coating, comma coating, slot die coating, lip coating, solution casting or the like. Further, the first hard coating composition may be applied such that a first hard coating layer formed by completely curing the applied first hard coating composition has a thickness of about 50 to about 300 μm, or about 50 to about 150 μm, or about 70 to about 100 μm.

Next, one side of the supporting substrate coated with the first coating composition is irradiated with ultraviolet having a first wavelength to photocure the first coating composition. In this case, the ultraviolet having a first wavelength may be a short-wavelength ultraviolet having a wavelength of about 280 to less than about 320 nm.

FIG. 6 is a sectional view showing the partially-photocured first hard coating composition.

Referring to FIG. 6, since the first coating composition 200 including the first binder is shrunk due to the curing in the first photocuring step, a curing contraction phenomenon or curl phenomenon in which a supporting substrate is rolled up due to the shrinkage attributable to curing occurs.

In the first curing step, the first hard coating layer 20 is formed such that it satisfies the following Formula 1:

$$R1/L1 \geq 0.4 \quad (1)$$

In the Formula 1, R1 is a curvature radius (unit: mm) of the first hard coating layer, the curvature radius thereof being caused by a curing shrinkage of the first hard coating composition in one-side coating and curing of the first hard coating composition, and L1 is an arc length (unit: mm) of the first hard coating layer.

In order to form the first hard coating layer 20 satisfying the Formula 1, the first binder of the first hard coating composition applied on one side of the supporting substrate 10 is not completely cured at once, but partially cured at a ratio of about 30 to about 60 mol %, or about 40 to about 50 mol %.

FIG. 7 is a sectional view showing the steps of: applying a second hard coating composition onto the other side of the supporting substrate; and irradiating the other side of the supporting substrate coated with the second coating composition with ultraviolets having a first wavelength and a second wavelength to photocure the second coating composition.

In this way, a second hard coating layer 30 is formed.

The second hard coating composition may be applied such that a second hard coating layer formed by completely curing the applied second hard coating composition 30 has a thickness of about 50 to about 300 µm, or about 50 to about 150 µm, or about 70 to about 100 µm.

In this case, the second hard coating layer 30 satisfies the following Formula 2, and the first and second hard coating layers 10 and 20 satisfy the following Formula 3:

$$R2/L2 \geq 0.4 \quad (2)$$

wherein R2 is a curvature radius (unit: mm) of the second hard coating layer, the curvature radius thereof deriving from a curing shrinkage of the second hard coating composition in one-side coating and curing of the second hard coating composition, and L2 is an arc length (unit: mm) of the second hard coating layer, $$-0.05 \leq R1/L1 - R2/L2 \leq 0.05 \quad (3)$$

wherein R1, L1, R2 and L2 were defined in the Formulae 1 and 2.

As described above, when the first and second hard coating layers are formed such that R2/L2 is 0.4 or more and the absolute value of difference between R1/L1 and R2/L2 is 0.05 or less, the curl caused by the curing shrinkage of the first hard coating layer 20 is set off by the curing shrinkage of the second hard coating layer 30, thus obtaining a flat hard coating film 100.

According to an embodiment of the present invention, the first wavelength may be about 280 to less than about 320 nm, and the second wavelength may be about 320 to about 400 nm.

The ultraviolet having a first wavelength photocures the second hard coating composition 30, and the ultraviolet having a second wavelength higher than the first wavelength penetrates the supporting substrate 10 coated with the second hard coating composition 30 to reaches the first hard coating composition 20 located opposite to the second hard coating composition 30 to photocure the first hard coating composition 20. In this case, the first hard coating composition 20 partially photocured in the above first photocuring step may be completely photocured by the second photocuring step. Further, in the second photocuring step, the irradiation of ultraviolet is conducted from a side opposite to the side of the supporting substrate 10 coated with the first hard coating composition 20, and thus curls formed due to the curing shrinkage in the first photocuring step are set off in a direction opposite thereto, thus obtaining a flat hard coating film.

The hard coating film obtained by the method of the present invention can be usefully used in various fields because it exhibits high hardness, scratch resistance, transparency, durability, light resistance and light transmission.

For example, the hard coating film obtained by the method of the present invention may have a pencil hardness of 7H or more, 8H or more or 9H or more under a load of 1 kg of load.

Further, when a friction tester is mounted with a steel wool #0000 and then the steel wool #0000 is reciprocated on the hard coating film of the present invention 400 times under a load of 500 g, two or less scratches may be formed on the hard coating film.

Further, the hard coating film obtained by the method of the present invention may have a light transmittance of 91.0% or more or 92.0% or more and a haze of 1.0% or less, 0.5% or less, or 0.4% or less.

Further, when the hard coating film obtained by the method of the present invention is exposed to a temperature of 50° C. or more and a humidity of 80% or more for 70 hours or more and then placed on a plane, the maximum distance at which each edge of the hard coating film is spaced apart from the plane may be about 1.0 mm or less, about 0.6 mm or less or about 0.3 mm or less. More specifically, when the hard coating film is exposed to a temperature of 50 to 90° C. and a humidity of 80 to 90% for 70 to 100 hours or more and then placed on a plane, the maximum distance at which each edge of the hard coating film is spaced apart from the plane may be about 1.0 mm or less, about 0.6 mm or less or about 0.3 mm or less.

Further, the hard coating film obtained by the method of the present invention may have an initial color b* value of 1.0 or less. Further, when the hard coating film is exposed to UV-B for 72 hours or more by an ultraviolet lamp, the difference between the initial color b* value of the hard coating film and the color b* value of the hard coating film exposed to UV-B may be 0.5 or less or 0.4 or less.

As described above, the hard coating film prepared by the method of the present invention can be used in various fields. For example, the hard coating film of the present invention can be used in touch panels of mobile terminals, smart phones or tablet PCs and covers of displays or devices.

Hereinafter, the present invention will be described in more detail with reference to the following Examples. However, these Examples are set forth to illustrate the present invention, and the scope of the present invention is not limited thereto.

EXAMPLES

Preparation Example 1: Preparation of Photocurable Elastic Polymer

In a reactor, 50 g of a caprolactone-grafted polyrotaxane polymer [A1000, Advanced Soft Material INC] was mixed with 4.53 g of Karenz-AOI [2-acryloylethyl isocyanate, Showadenko Inc.], 20 mg of dibutyltin dilaurate [DBTDL, Merck Corp.], 110 mg of hydroquinone monomethylene ether and 315 g of methyl ethyl ketone. Then, the mixture was reacted at 70° C. for 5 hours to obtain polyrotaxane in which polylactone with an acrylate moiety conjugated to the end thereof acted as the macrocycle while cyclodextrin was positioned as the stopper.

The weight average molecular weight of the obtained polyrotaxane was 600,000 g/mol, and the elongation thereof was 20%, as measured according to ASTM D638.

Example 1

9 g of a silica-dipentaerythritolhexacrylate (DPHA) composite (silica 3.6 g, DPHA 5.4 g) dispersed with silica nanoparticles having a particle size of 20~30 nm in an amount of 40 wt %, 1 g of polyrotaxane of Preparation Example 1, 0.2 g of a photoinitiator (brand name: Darocur TPO), 0.1 g of a benzotriazole-based yellowing inhibitor (brand name: Tinuvin 400) and 0.05 g of a fluorine-based surfactant (brand name: FC4430) were mixed to prepare a first hard coating composition.

The first hard coating composition was applied onto one side of a PET supporting substrate having a size of 15 cm×20 cm and a thickness of 188 µm. Then, the PET supporting substrate coated with the first hard coating composition was irradiated with ultraviolet having a wavelength of 280~350 nm using a black light fluorescent lamp to photocure the first hard coating composition.

The first hard coating composition was applied onto the other side of the PET supporting substrate. Then, the PET supporting substrate coated with the first hard coating composition was irradiated with ultraviolet having a wavelength of 280~350 nm using a black light fluorescent lamp to photocure the first hard coating composition, thereby preparing a hard coating film. Here, the thickness of each of the first and second hard coating layers formed on both sides of the PET supporting substrate was 100 μm.

Example 2

9 g of a silica-dipentaerythritolhexacrylate (DPHA) composite (silica 3.6 g, DPHA 5.4 g) dispersed with silica nanoparticles having a particle size of 20~30 nm in an amount of 40 wt %, 1 g of polyrotaxane of Preparation Example 1, 0.2 g of a photoinitiator (brand name: Darocur TPO), 0.1 g of a benzotriazole-based yellowing inhibitor (brand name: Tinuvin 400) and 0.05 g of a fluorine-based surfactant (brand name: FC4430) were mixed to prepare a first hard coating composition.

6 g of trimethylolpropane triacylate (TMPTA), 4 g of polyrotaxane of Preparation Example 1, 0.2 g of a photoinitiator (brand name: Darocur TPO), 0.1 g of a benzotriazole-based yellowing inhibitor (brand name: Tinuvin 400), 0.05 g of a fluorine-based surfactant (brand name: FC4430) and 1 g of methyl ethyl ketone (MEK) were mixed to prepare a second hard coating composition.

The first hard coating composition was applied onto one side of a PET supporting substrate having a size of 15 cm×20 cm and a thickness of 188 μm. Then, the PET supporting substrate coated with the first hard coating composition was irradiated with ultraviolet having a wavelength of 280~350 nm using a black light fluorescent lamp to photocure the first hard coating composition.

The second hard coating composition was applied onto the other side of the PET supporting substrate. Then, the PET supporting substrate coated with the second hard coating composition was irradiated with ultraviolet having a wavelength of 280~350 nm using a black light fluorescent lamp to photocure the second hard coating composition, thereby preparing a hard coating film. Here, the thickness of each of the first and second hard coating layers formed on both sides of the PET supporting substrate was 100 μm.

Example 3

9 g of a silica-dipentaerythritolhexacrylate (DPHA) composite (silica 3.6 g, DPHA 5.4 g) dispersed with silica nanoparticles having a particle size of 20-30 nm in an amount of 40 wt %, 1 g of a urethane acrylate-based polymer (brand name: UA200PA, Shinnakamura Chemicals Corp., weight average molecular weight: 2,600 g/mol, elongation measured based on ASTM D638: 170%), 0.2 g of a photoinitiator (brand name: Darocur TPO), 0.1 g of a benzotriazole-based yellowing inhibitor (brand name: Tinuvin 400) and 0.05 g of a fluorine-based surfactant (brand name: FC4430) were mixed to prepare a first hard coating composition.

6 g of trimethylolpropane triacylate (TMPTA), 4 g of a urethane acrylate-based polymer (brand name: UA200PA), 0.2 g of a photoinitiator (brand name: Darocur TPO), 0.1 g of a benzotriazole-based yellowing inhibitor (brand name: Tinuvin 400), 0.05 g of a fluorine-based surfactant (brand name: FC4430) and 1 g of methyl ethyl ketone (MEK) were mixed to prepare a second hard coating composition.

Hereinafter, a hard coating film was prepared in the same manner as in Example 1.

Example 4

9 g of a silica-dipentaerythritolhexacrylate (DPHA) composite (silica 3.6 g, DPHA 5.4 g) dispersed with silica nanoparticles having a particle size of 20~30 nm in an amount of about 40 wt %, 1 g of polyrotaxane of Preparation Example 1, 0.2 g of a photoinitiator (brand name: Darocur TPO), 0.1 g of a benzotriazole-based yellowing inhibitor (brand name: Tinuvin 400) and 0.05 g of a fluorine-based surfactant (brand name: FC4430) were mixed to prepare a first hard coating composition.

4 g of trimethylolpropane triacylate (TMPTA), 6 g of polyrotaxane of Preparation Example 1, 0.2 g of a photoinitiator (brand name: Darocur TPO), 0.1 g of a benzotriazole-based yellowing inhibitor (brand name: Tinuvin 400), 0.05 g of a fluorine-based surfactant (brand name: FC4430) and 1 g of methyl ethyl ketone (MEK) were mixed to prepare a second hard coating composition.

The first hard coating composition was applied onto one side of a PET supporting substrate having a size of 15 cm×20 cm and a thickness of 188 μm. Then, the PET supporting substrate coated with the first hard coating composition was irradiated with ultraviolet having a wavelength of 280~350 nm using a black light fluorescent lamp to photocure the first hard coating composition.

The second hard coating composition was applied onto the other side of the PET supporting substrate. Then, the PET supporting substrate coated with the second hard coating composition was irradiated with ultraviolet having a wavelength of 280~350 nm using a black light fluorescent lamp to photocure the second hard coating composition, thereby preparing a hard coating film. Here, the thickness of the first hard coating layer was 100 μm, and the thickness of the second hard coating layer was 120 μm.

Example 5

A hard coating film was prepared in the same manner as in Example 4, except that, in the first hard coating composition, 1 g of a urethane acrylate-based polymer (brand name: UA200PA) was used instead of 1 g of polyrotaxane of Preparation Example 1, and that, in the second hard coating composition, 6 g of a urethane acrylate-based polymer (brand name: UA200PA) was used instead of 6 g of polyrotaxane of Preparation Example 1.

Comparative Example 1

A hard coating film was prepared in the same manner as in Example 4, except that the thickness of each of the first and second hard coating layers was 100 μm.

Comparative Example 2

A hard coating film was prepared in the same manner as in Example 5, except that the thickness of each of the first and second hard coating layers was 100 μm.

Test Example

<Measuring Method>
1) R1/L1 Value

A first hard coating composition was applied onto only one side of a supporting substrate, and was then photocured to form a hard coating film. When the hard coating film was cut to a size of 10 cm×10 cm and placed on a plane, the maximum distance (H1) at which each edge of the hard coating film is spaced apart form the plane and the chord length (S1) of the hard coating film were measured, and R1 value was calculated by the following Equation 1:

$$R_1 = (H_1/2) + (S_1^2/8H_1) \qquad \text{[Equation 1]}$$

2) R2/L2 Value

A second hard coating composition was applied onto only one side of a supporting substrate, and was then photocured to form a hard coating film. When the hard coating film was cut to a size of 10 cm×10 cm and placed on a plane, the maximum distance (H2) at which each edge of the hard coating film is spaced apart from the plane and the chord length (S2) of the hard coating film were measured, and R2 value was calculated by the following Equation 2:

$$R_2 = (H_2/2) + (S_2^2/8H_2)$$ [Equation 2]

3) R/L Value

A hard coating film provided with first and second hard coating layer was cut to a size of 10 cm×10 cm and placed on a plane, the maximum distance (H) at which each edge of the hard coating film is spaced apart from the plane and the chord length (S) of the hard coating film were measured, and R value was calculated by the following Equation 3:

$$R = (H/2) + (S^2/8H)$$ [Equation 3]

4) Curl Property

When a hard coating film provided with first and second hard coating layers was cut to a size of 10 cm×10 cm and then placed on a plane, the maximum distance at which each edge of the hard coating film is spaced apart from the plane was measured. When the maximum value thereof is 0.3 mm or less, it is indicated by OK, and when the maximum value thereof is more than 0.3 mm, it is indicated by X.

5) Cylindrical Bending Test

Each of the hard coating films was wound on a cylindrical mandrel having a diameter of 1 cm so that the second hard coating is toward outside, and then it was determined whether or not each of the hard coating film was cracked. IF each of the hard coating films was not cracked, it was evaluated as OK, and if it was cracked, it was evaluated as X.

6) Pencil Hardness

Pencil hardness was evaluated according to the Japanese Standard JIS K5400. In this regard, a pencil hardness meter was reciprocated three times on the first hard coating layer of each of the hard coating films under a load of 1.0 kg to determine the hardness at which no scratches were observed.

7) Scratch Resistance

After being loaded to a friction tester, a steel wool (#0000) was reciprocated 400 times on the first hard coating layer of each of the hard coating films under a load of 0.5 kg, and scratches thus formed were counted. Evaluation was made of the scratch resistance of the films by marking O for two or less scratches, Δ for two to less than five scratches, and x for five or more scratches.

8) Light Resistance

Differences in color b* value of the hard coating films were measured before and after exposure to UVB from UV lamp for 72 hours.

9) Transmittance and Haze

The transmittance and haze of a hard coating film were measured using a spectrophotometer (brand name: COH-400).

10) Curl Property to Temperature and Humidity

When each of the hard coating films was cut to a size of 10 cm×10 cm, stored in a chamber at a temperature of 85° C. and a humidity of 85% for 72 hours and then placed on a plane, the maximum distance at which each edge of the hard coating film was spaced apart the plane was measured.

11) Impact Resistance

The impact resistance of the first hard coating layer of each of the hard coating films was evaluated by determining whether or not the first hard coating layer was cracked when a 22 g steel ball was dropped thereon from a height of 40 cm. When the first hard coating layer was not cracked, it is indicated by OK, and when it was cracked, it is indicated by X.

The results of the physical properties measured in the hard coating films are summarized in Table 1 below.

TABLE 1

|  | Ex. 1 | Ex. 2 | Ex. 3 | Ex. 4 | Ex. 5 | Comp. Ex. 1 | Comp. Ex. 2 |
| --- | --- | --- | --- | --- | --- | --- | --- |
| R1/L1 | 0.77 | 0.77 | 0.63 | 0.77 | 0.63 | 0.77 | 0.63 |
| R1/L1 − R2/L2 | 0.00 | 0.03 | 0.02 | 0.04 | 0.01 | 0.10 | 0.07 |
| R/L | 35.0 | 31.5 | 24.3 | 40.7 | 35.5 | 12.0 | 10.5 |
| Curl property | OK | OK | OK | OK | OK | X | X |
| Bending test | OK | OK | OK | OK | OK | OK | OK |
| Pencil hardness | 8H | 8H | 9H | 8H | 9H | 8H | 9H |
| Scratch resistance | OK | OK | OK | OK | OK | OK | OK |
| Light resistance | 0.20 | 0.20 | 0.18 | 0.23 | 0.20 | 0.19 | 0.20 |
| Transmittance | 92.0 | 92.0 | 92.2 | 91.8 | 92.0 | 92.0 | 92.1 |
| Haze | 0.2 | 0.3 | 0.3 | 0.4 | 0.3 | 0.3 | 0.3 |
| Curl property to temperature and humidity | 0.2 mm | 0.3 mm | 0.2 mm | 0.3 mm | 0.3 mm | 4.5 mm | 6.5 mm |
| Impact resistance | OK | OK | OK | OK | OK | OK | OK |

As given in Table 1 above, in the hard coating films obtained by the method of the present invention, the curl caused by the curing shrinkage of a first hard coating composition is adjusted at a predetermined level or less, and is set off in a direction opposite thereto by the curing shrinkage of a second hard coating composition, and thus thick hard coating layers can be formed without forming curl or crack, thereby preparing a flat hard coating film of high hardness. Further, these hard coating films exhibit excellent optical properties.

REFERENCE NUMERALS

10: supporting substrate
20: first hard coating layer
30: second hard coating layer
100: hard coating film

The invention claimed is:
1. A hard coating film, comprising:
a supporting substrate;
a first hard coating layer formed on one side of the supporting substrate; and
a second hard coating layer formed on the other side of the supporting substrate, wherein the hard coating film satisfies the following Formula 4: R/L≥20, in which R is a curvature radius (unit: mm) of the hard coating film, and L is an arc length (unit: mm) of the hard coating film, wherein the first and second hard coating layers are the same or different from one another and independently have a thickness of 50 to 300 μm, and wherein the hard coating film has a pencil hardness of 7H or more at a load of 1 kg.

2. The hard coating film of claim 1, wherein the first and second hard coating layers are the same or different from one another and independently include a photocurable crosslinked copolymer of tri- to hexa-functional acrylate-based monomers.

3. The hard coating film of claim 2, wherein the first and second hard coating layers are the same or different from one another and independently include a photocurable crosslinked copolymer of tri- to hexa-functional acrylate-based monomers and mono- to di-functional acrylate-based monomers.

4. The hard coating film of claim 2, wherein the first and second hard coating layers are the same or different from one another and independently include a photocurable crosslinked copolymer of tri- to hexa-functional acrylate-based monomers and a photocurable elastic polymer.

5. The hard coating film of claim 4, wherein the photocurable elastic polymer has an elongation of 15 to 200%, as measured according to ASTM D638.

6. The hard coating film of claim 4, wherein the photocurable elastic polymer independently includes at least one selected from the group consisting of polycaprolactone, a urethane acrylate-based polymer, and polyrotaxane.

7. The hard coating film of claim 2, wherein the first and second hard coating layers are the same or different from one another and independently further include inorganic particles dispersed in the photocurable crosslinked polymer.

* * * * *